(12) United States Patent
Lizzi

(10) Patent No.: US 6,270,217 B1
(45) Date of Patent: Aug. 7, 2001

(54) EYEGLASS FRAME PROTECTOR DISPENSING SYSTEM AND METHOD

(75) Inventor: Michael Lizzi, 52 Mayflower Dr., Erial, NJ (US) 08081

(73) Assignee: Michael Lizzi, Erial, NJ (US)

( * ) Notice: Subject to any disclaimer, the term of this patent is extended or adjusted under 35 U.S.C. 154(b) by 0 days.

(21) Appl. No.: 09/548,546

(22) Filed: Apr. 13, 2000

(51) Int. Cl.$^7$ ........................................ G02C 5/14
(52) U.S. Cl. ................................................ 351/122
(58) Field of Search ................... 351/122, 111

(56) References Cited

U.S. PATENT DOCUMENTS

| | | | |
|---|---|---|---|
| 4,786,158 | 11/1988 | Barfus-Shanks | 351/122 |
| 5,440,355 | 8/1995 | Ross | 351/122 |
| 5,583,585 | * 12/1996 | Sternberg et al. | 351/122 |

* cited by examiner

Primary Examiner—Huy Mai
(74) Attorney, Agent, or Firm—Stuart M. Goldstein

(57) ABSTRACT

Eyeglass frame protective coverings are formed on sheets, which make up a cylindrical roll. The roll consists of a plurality of perforated, connected sheets, each sheet containing one protective covering formed on each sheet. Each protective covering is connected to its respective sheet by perforations, which allows the covering to be easily removed from the sheet for use. A bridge section interconnects the two tubular pocket-like temple frame components of the protective covering. The bridge section is configured to be pulled to remove the covering from the sheet and is also perforated at its midpoint, thus allowing the bridge section to be easily separated once the temple frame components are placed on the temple pieces of the eyeglasses. Once separated, the two parts of the bridge section are draped over the temple pieces and are then available to assist in the clean and efficient removal of the two components of the covering, after the components become wet and soiled. After use, the protective coverings are simply disposed of. It is contemplated that each sheet in the roll of sheets and the protective coverings will be made of a lightweight, flexibly formed plastic.

18 Claims, 2 Drawing Sheets

EYEGLASS FRAME PROTECTOR DISPENSING SYSTEM AND METHOD

BACKGROUND OF THE INVENTION

Various types of coverings for the protection of eyeglass frames have been used for a variety of purposes. Specific to the present invention is the use of such protective coverings when the eyeglass wearer is undergoing some type of treatment or procedure to his or her hair or scalp employing substances which potentially may damage eyeglass frames.

A prime example of such a circumstance relates to dermatological treatment of patients. Medication applied to and remaining on the skin or scalp of the temple region may contain components which can cause damage to eyeglass temple pieces worn by the patient. Likewise, in the beauty salon setting, the patron receiving a hair treatment or undergoing a permanent or hair dying process, may need to have treatment substances, dyes, or certain chemicals in his or her hair for prolonged periods of time. Eyeglasses may need to be worn during these extended times for the comfort and convenience of the patron or by necessity. During these various processes, injurious substances may drip onto the eyeglass frames of the patron, often times permanently damaging expensive frames.

Present attempts to provide protective eyeglass frame coverings have included the use of such materials as tissue paper or aluminum foil wrapped around the temple pieces. Tissue paper is difficult to maintain on glass frames and does not afford adequate protection against moisture and especially harsh chemicals or similar substances. Aluminum foil is also inadequate, in that this material, itself, may damage frames. It is uncomfortable for the user and is not wholly effective in keeping out moisture.

Other attempts to provide eyeglass protection have additional disadvantages. For instance the coverings disclosed in U.S. Pat. No. 4,786,158 are too elaborate to be practical for use as disposable eyeglass frame protection. Such coverings also do not provide a means for efficient and clean removal, after they are used and become wet and soiled. These coverings also are not configured to be readily stored and easily dispensed for use. The coverings shown in U.S. Pat. No. 5,440,355 suffer from similar disadvantages. The coverings here do not even contemplate the liquid proofing, disposal features which are an inherent part of the present invention.

SUMMARY OF THE INVENTION

It is thus an object of the present invention to provide an eyeglass frame protection dispensing system which overcomes the limitations and disadvantages of prior devices.

It is an object of the present invention to provide an eyeglass frame protection dispensing system which constitutes flexible and effective protective coverings, efficiently stored for easy and convenient access.

It is a further object of the present invention to provide an eyeglass frame protection dispensing system in which the protective coverings are readily available for quick access for the protection of eyeglass frames which may be subject to damage from moisture, chemicals, or other injurious substances.

It is another object of the present invention to provide an eyeglass frame protection dispensing system which provides for the protection of eyeglass frames without risk of damage to the frames.

It is still another object of the present invention to provide an eyeglass frame protection dispensing system providing eyeglass frame protective coverings which can easily and efficiently be removed from the frames after use, in a sanitary manner, without soiling the frames or the hands of the individual removing the coverings.

It is another object of the present invention to provide an eyeglass frame protection dispensing system to provide eyeglass fame protective coverings which are easily and readily disposable.

These and other objects of the invention are accomplished by the present invention which comprises eyeglass frame protective coverings which are formed on sheets, which make up a cylindrical roll. The roll consists of a plurality of perforated, connected sheets, each sheet containing one protective covering formed on each sheet. Each protective covering is connected to its respective sheet also by perforations, which allows the covering to be easily removed from the sheet for use. A bridge section interconnects the two tubular pocket-like temple frame components of the protective covering. The bridge section is configured to be pulled to remove the covering from the sheet and is also perforated at its midpoint, thus allowing the bridge section to be easily separated once the temple frame components are placed on the temple pieces of the eyeglasses. Once separated, the two parts of the bridge section are draped over the temple pieces and are then available to assist in the clean and efficient removal of the two components of the covering, after the components become wet and soiled. After use, the protective coverings are simply disposed of. It is contemplated that each sheet in the roll of sheets and the protective coverings will be made of a lightweight, flexibly formed plastic.

The novel features which are considered as being characteristic of the invention are set forth in particular in the appended claims. The invention itself, however, both as to its design, construction, and use, together with additional features and advantages thereof, are best understood upon a review of the following detailed description with reference to the accompanying drawings.

DETAILED DESCRIPTION OF THE INVENTION

Figure 1:
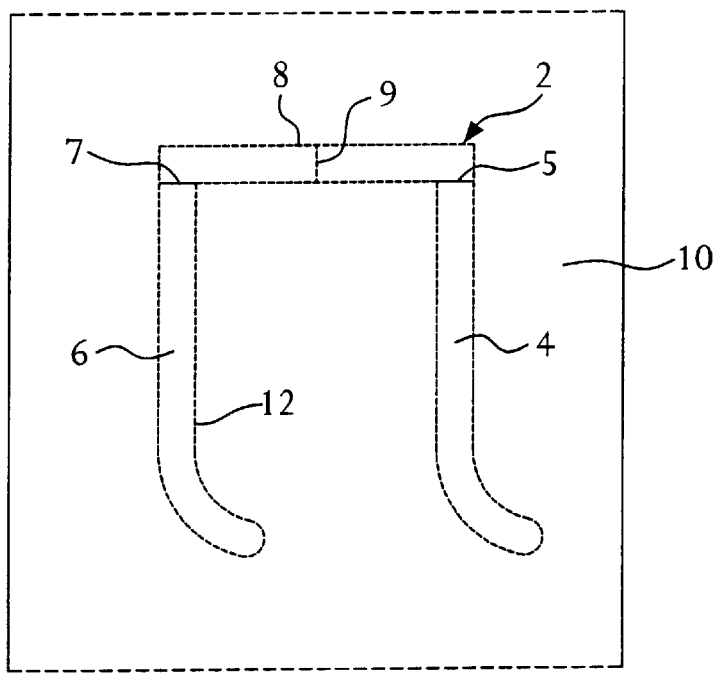
FIG. 1 is a view of the eyeglass frame protector coverings of the present invention mounted on a dispensing sheet.

Eyeglass frame protective covering 2 is made up of two temple frame protective covering components 4 and 6 and bridge section 8, interconnecting components 4 and 6. Bridge Section 8 has perforation 9 at its midpoint. Components 4 and 6 are tubular pocket members with open ends 5 and 7, respectively. Covering 2 is formed within sheet 10 and connected to sheet 10 by perforations 12, which substantially surround all components of covering 2. It is contemplated that both covering 2 and sheet 10 will be formed of lightweight transparent, flexible plastic material, similar, but not limited to the material commonly found in food markets to hold produce and other food products.

Figure 2:
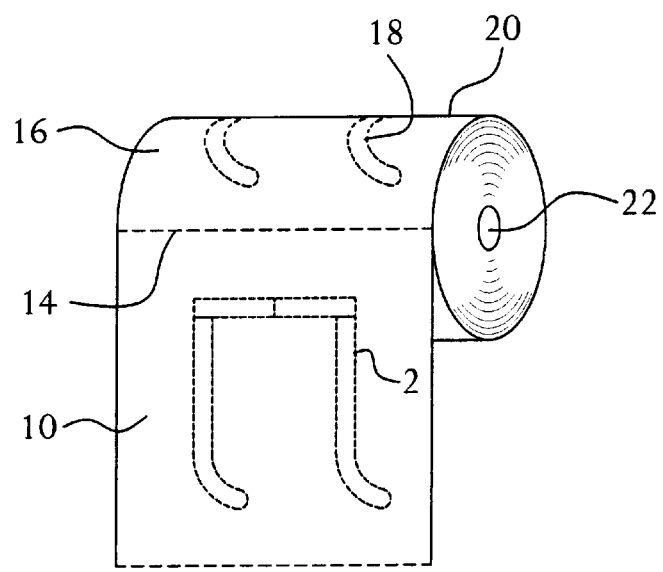
FIG. 2 is a view of the roll of protector coverings of the present invention.

As seen in FIG. 2, sheet 10 with covering 2 is connected by perforations 14 to identically configured second sheet 16 with protective covering 18 connected therein. It can then be appreciated that roll 20 is formed from a plurality of sheets with protective coverings connected thereon, all interconnected by perforations and scrolled around a center core 22.

Figure 3:
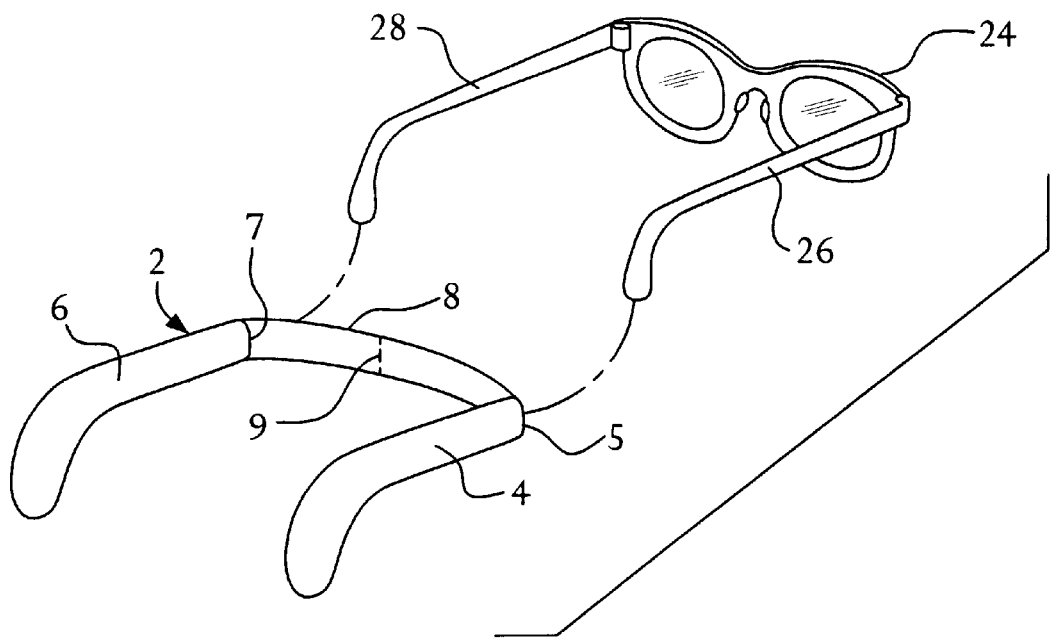
FIG. 3 is a view of the protector coverings of the present invention, prior to placement on an eyeglass frame.
Figure 4:
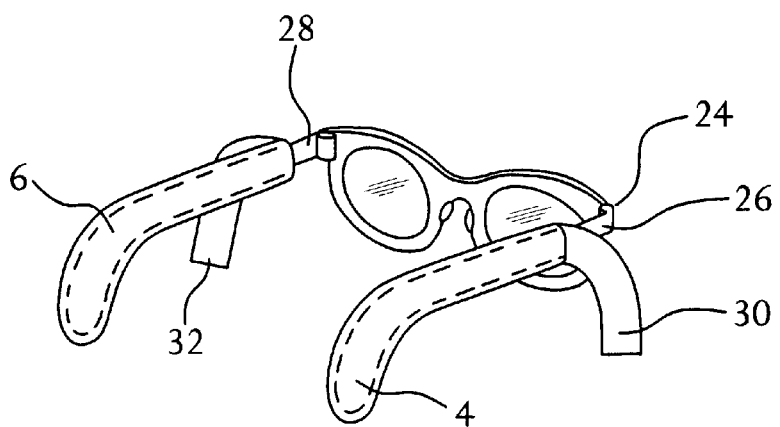
FIG. 4 is a view of the protector coverings of the present invention on an eyeglass frame.

The use of the protective covering system is as follows. When protection for eyeglass frames 24, shown in FIGS. 3 and 4, is required, sheet 10 is pulled outward, causing perforations 14 to break, separating sheet 10 from roll 20. Bridge section 8 is then pulled outward at its approximate midpoint. This causes perforations 12 to break free, allowing protective covering 2 to be removed from sheet 10. Empty sheet 10 can now be discarded.

Temple frame covering components 4 and 6, now free as elongated flexible plastic tubular members, are inserted, at each of their respective open ends 5 and 7, onto frame temple pieces 20 and 28, of eyeglass frame 24. Once components 4 and 6 are in place over temple pieces 20 and 28, perforation 9 in bridge section 8 is broken apart and the two halves 30 and 32 of the bridge section are draped over temple pieces 26 and 28, respectively, as seen in FIG.4.

After the medical, hair, or similar treatment has been completed and protective covering components 4 and 6 have become wet or soiled from the treatment's medications, chemicals, or other substances, the components are simply removed from temple pieces 26 and 28 by pulling on bridge halves 30 and 32. Components 4 and 6 are then discarded.

Thus, this eyeglass frame protector dispensing system provides an efficient, simple, convenient and sanitary means of protecting eyeglass frames from moisture, chemicals, or other injurious substances. The dispensing technique makes the protective coverings readily and easily accessible and disposal of used coverings is likewise simple and convenient.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

What is claimed is:

1. An eyeglass frame protector dispensing system comprising:
   (a) eyeglass protection means for enclosing the temple pieces of eyeglass frames;
   (b) sheet means on which the protection means are mounted and stored;
   (c) attachment means for removably connecting the protection means to the sheet means; said attachment means comprising perforation means which substantially surround the protection means, for removably connecting the protection means to the sheet means.

2. The eyeglass frame protector dispensing system as in claim 1 further comprising bridge means connected to the protection means permitting ready removal of the protection means from the sheet means.

3. The eyeglass frame protection dispensing system as in claim 2 in which the protection means comprises dual eyeglass temple piece protectors which are interconnected by the bridge means.

4. The eyeglass frame protection dispensing system as in claim 3 in which the bridge means comprises perforations, allowing for separation of the dual temple piece protectors.

5. The eyeglass frame protection dispensing system as in claim 2 in which the attachment means also comprises perforation means which substantially surround the bridge means for removably connecting the bridge means to the sheet means.

6. The eyeglass frame protection dispensing system as in claim 1 comprising a plurality of interconnected sheet means, each sheet means comprising its own, individual, removably connected protection means.

7. The eyeglass frame protection dispensing system as in claim 6 in which each sheet means in the plurality of sheet means is interconnected by perforations.

8. The eyeglass frame protection dispensing system as in claim 6 in which the plurality of sheet means are configured to form a roll of sheet means.

9. The eyeglass frame protection dispensing system as in claim 8 in which the plurality of sheet means are interconnected by perforations.

10. The eyeglass frame protection dispensing system as in claim 1 in which the protection means comprises dual eyeglass temple piece protectors.

11. The eyeglass frame protection dispensing system as in claim 1 in which the protection means comprises dual tubular pockets formed within the sheet means.

12. The eyeglass frame protection dispensing system as in claim 1 in which the protection means, sheet means, and bridge means are comprised of a lightweight, flexibly formed plastic material.

13. The eyeglass frame protection dispensing system as in claim 12 in which the protection means and bridge means are formed on the sheet means.

14. The method of protecting eyeglass frames with temple pieces, comprising the steps of:
   (a) providing a roll of flexibly formed plastic material sheets comprising dual eyeglass temple piece coverings formed on each sheet;
   (b) unwinding the roll such that one sheet is free of the roll;
   (c) separating the one sheet from the roll;
   (d) pulling the dual eyeglass temple piece coverings completely off the one sheet;
   (e) inserting the dual eyeglass temple piece coverings onto temple pieces of an eyeglass frame; and
   (f) discarding the one sheet.

15. The method of protecting eyeglass frames as in claim 14 in which the temple piece coverings comprise an interconnected bridge member and further comprising the steps of separating the bridge member into two sections at its substantial mid-point and positioning the sections over the outside surfaces of the temple pieces of the eyeglass frame.

16. The method of protecting eyeglass frames as in claim 15 further comprising the step of pulling each of the separated bridge sections to remove the temple piece coverings from the temple pieces of the eyeglass frame.

17. The method of protecting eyeglass frames as in claim 16 further comprising the step of discarding the separated bridge sections and the temple piece coverings.

18. The method of protecting eyeglass frames as in claim 14 further comprising the step of separating the one sheet from the roll by tearing a perforation interconnecting the sheets on the roll.

\* \* \* \* \*